US006739877B2

(12) United States Patent
Bailey et al.

(10) Patent No.: US 6,739,877 B2
(45) Date of Patent: May 25, 2004

(54) DISTRIBUTIVE PROCESSING SIMULATION METHOD AND SYSTEM FOR TRAINING HEALTHCARE TEAMS

(75) Inventors: Bradford E. Bailey, Louisville, KY (US); Bill B. Clark, Castle Rock, CO (US); Chen Yuanming, Englewood, CO (US); Qiang Gao, Englewood, CO (US); Dave Wilson, Castle Rock, CO (US); William E. Younkes, Greenwood Village, CO (US)

(73) Assignee: Medical Simulation Corporation, Denver, CO (US)

( * ) Notice: Subject to any disclaimer, the term of this patent is extended or adjusted under 35 U.S.C. 154(b) by 0 days.

(21) Appl. No.: 09/800,104

(22) Filed: Mar. 6, 2001

(65) Prior Publication Data

US 2002/0127525 A1 Sep. 12, 2002

(51) Int. Cl.[7] .............................................. G09B 23/28
(52) U.S. Cl. ...................................... 434/262; 434/219
(58) Field of Search ............................... 434/262, 267, 434/265, 266, 268, 272, 219

(56) References Cited

U.S. PATENT DOCUMENTS

| | | | |
|---|---|---|---|
| 4,360,345 A | | 11/1982 | Hon |
| 4,797,104 A | * | 1/1989 | Laerdal et al. ........... 434/265 X |
| 4,867,685 A | * | 9/1989 | Brush et al. ................. 434/234 |
| 4,907,973 A | | 3/1990 | Hon |
| 5,343,391 A | * | 8/1994 | Mushabac ..................... 433/76 |
| 5,509,810 A | * | 4/1996 | Schertz et al. ........... 434/262 X |
| 5,609,485 A | * | 3/1997 | Bergman et al. ......... 434/262 X |
| 5,765,561 A | * | 6/1998 | Chen et al. .................. 600/407 |
| 5,769,640 A | * | 6/1998 | Jacobus et al. ......... 434/262 X |
| 5,800,177 A | * | 9/1998 | Gillio .......................... 434/262 |
| 5,800,179 A | | 9/1998 | Bailey |
| 5,853,292 A | | 12/1998 | Eggert et al. |
| 5,882,206 A | * | 3/1999 | Gillio .......................... 434/262 |
| 6,032,119 A | * | 2/2000 | Brown et al. ............... 705/2 X |
| 6,062,865 A | | 5/2000 | Bailey |
| 6,074,213 A | | 6/2000 | Hon |
| 6,077,082 A | * | 6/2000 | Gibson et al. .......... 434/262 X |
| 6,113,395 A | | 9/2000 | Hon |
| 6,167,362 A | * | 12/2000 | Brown et al. ............. 703/11 X |
| 6,186,145 B1 | * | 2/2001 | Brown .................... 128/897 X |
| 6,193,519 B1 | * | 2/2001 | Eggert et al. ........... 434/262 X |
| 6,246,975 B1 | * | 6/2001 | Rivonelli et al. ......... 703/11 X |
| 6,346,940 B1 | * | 2/2002 | Fukunaga ............... 345/427 X |
| 6,386,882 B1 | * | 5/2002 | Linberg .................. 434/262 X |
| 6,505,065 B1 | * | 1/2003 | Yanof et al. ............. 600/427 X |
| 6,544,041 B1 | * | 4/2003 | Damadian ............... 434/262 X |
| 2003/0091967 A1 | * | 5/2003 | Chosack et al. ......... 434/262 X |

\* cited by examiner

*Primary Examiner*—S. Thomas Hughes
*Assistant Examiner*—Chanda L. Harris
(74) *Attorney, Agent, or Firm*—Gibson, Dunn & Crutcher LLP; Stanley J. Gradisar

(57) ABSTRACT

A simulation method and system based on a distributive processing model is used for training and educating healthcare teams. The system allows team members to be at the training facility or located remotely and connected via data communication links. The system allows multiple participants for individual team member roles at various connected simulation workstations. If simulation participants cannot man all the team roles, the system can provide virtual team members in their stead. The simulation server computer delivers to each workstation the particular programs and outputs required for any given simulation exercise.

17 Claims, 4 Drawing Sheets

DISTRIBUTIVE PROCESSING SIMULATION METHOD AND SYSTEM FOR TRAINING HEALTHCARE TEAMS

FIELD OF THE INVENTION

This invention relates to the field of simulations for medical training, and more particularly, to a distributive processing method and system for training healthcare teams.

BACKGROUND OF THE INVENTION

Healthcare education leaders have seen the need for simulation systems that efficiently train, evaluate, and enhance individual medical practitioner's skills to improve patient outcomes. In a recent survey, 73 of the 124 US medical schools are using some form of computer simulation for student evaluation. The development of simulation and training centers for the cognitive training of healthcare professionals in the practice of interventional medical procedures represents a significant advance in being able to promote the best demonstrated practices in the use of existing and new products and procedures. The introduction rate of new therapeutic devices and procedures is accelerating such that the lifecycle of a new product can be as short as eighteen months. At the same time the American College of Cardiology ("ACC") reports that 50% of the 10,000 interventional cardiologists do not meet the minimum standards for procedure competency. Current training methodology cannot address these problems. The answer is broad access to cognitive training and education on an industry wide universal platform that the present invention provides.

DETAILED DESCRIPTION OF THE INVENTION

Figure 1:
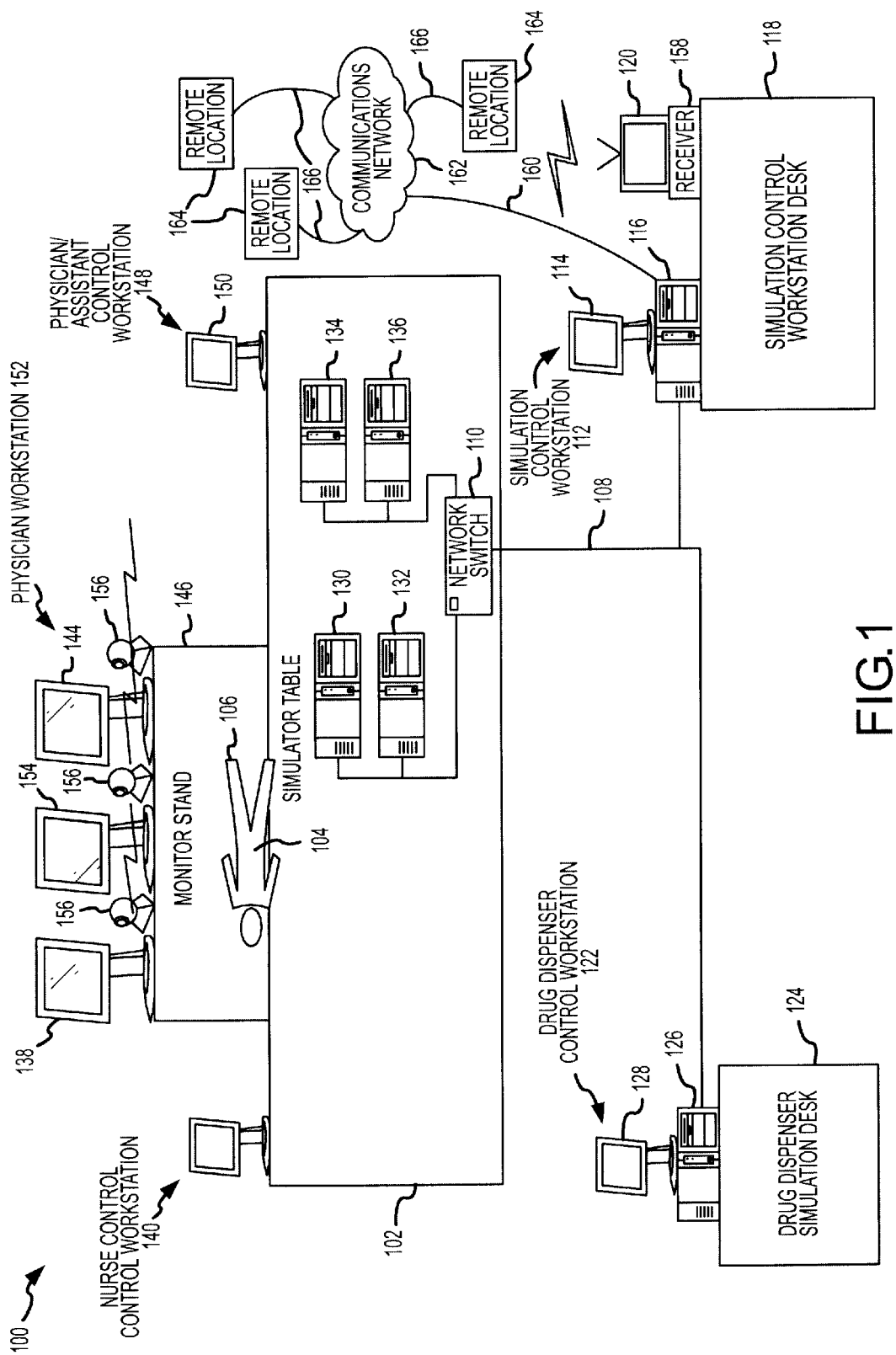
FIG. 1 shows a schematic/block diagram of the hardware for an exemplary embodiment of the distributive processing simulation method and system for training healthcare teams of the present invention.
Figure 2:
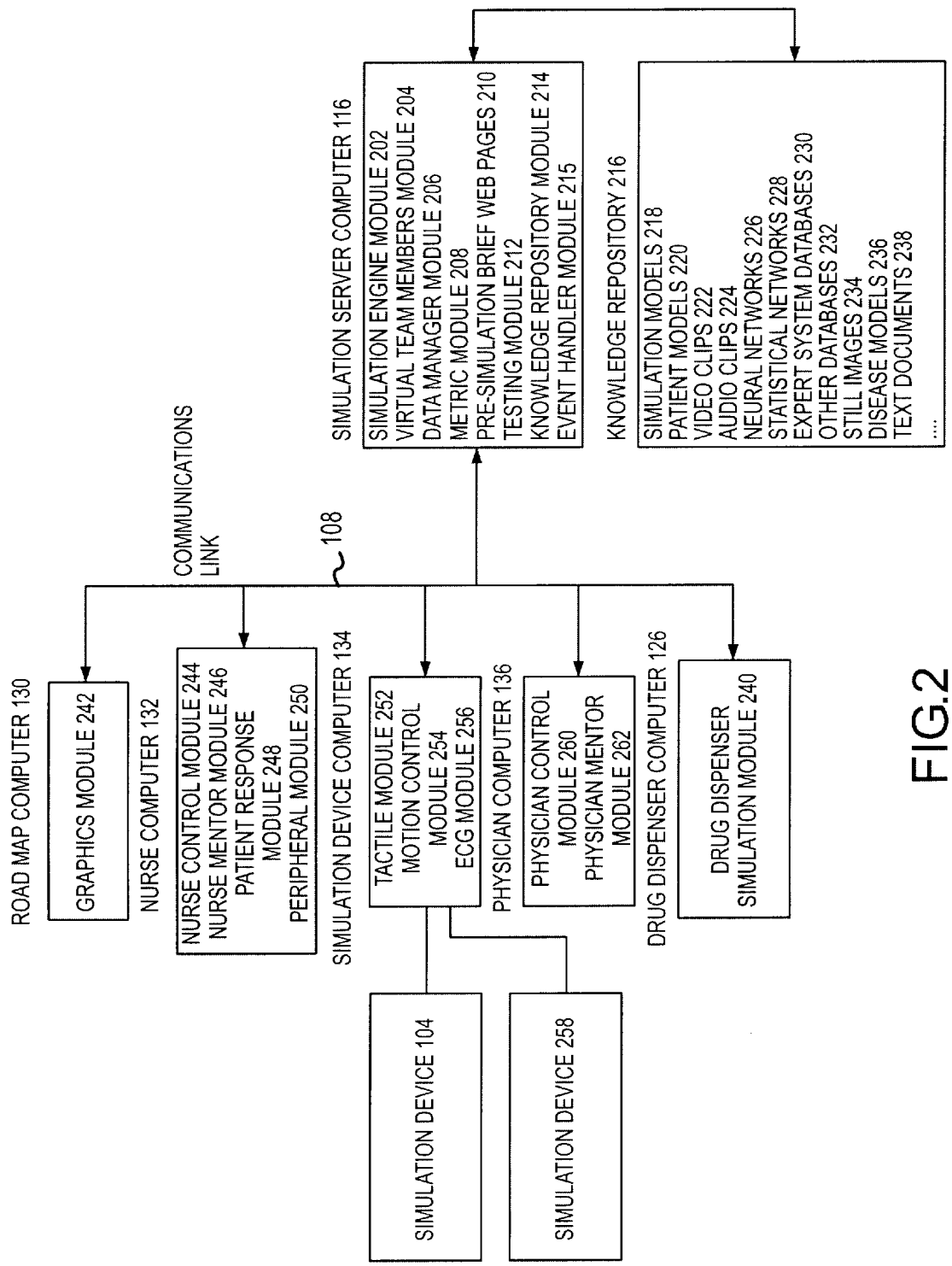
FIG. 2 shows a block diagram of the software distribution for an exemplary embodiment of the distributive processing simulation method and system for training healthcare teams of the present invention.

FIG. 1 shows a schematic/block diagram of the hardware and FIG. 2 shows a block diagram of the software distribution for an exemplary embodiment of the distributive processing simulation method and system for training healthcare teams of the present invention. Referring now to FIGS. 1 and 2, Simulation System 100 provides an industry platform, a standard for technical parameters, skill assessment and measurement, and communications capability. A unique aspect of the invention is the use of Artificial Patient 106 for cognitive training and decision making. Prior art, such as U.S. Pat. No. 6,074,213, granted to David C. Hon on Jun. 13, 2000, describes a procedural training system that is "event driven" and utilizes a rule-based system that predetermines outcomes from prescribed input events. The distributive processing simulation method and system for training healthcare teams of the present invention utilizes Artificial Patient 106 where the attributes of the simulated patient's anatomy, disease state, and the decisions and selections of the team member interact in both a deliberate and random manor, as in a real patient, to produce unpredictable outcomes. Even though a team member may properly execute a medical procedure, other complications as a result or related to the procedure, anatomy, disease state, medical device, or drug agent could result in an adverse event and a negative outcome. Conversely, if a team member initially experiences an adverse event but recognizes the implications of the event and implements appropriate corrective action, a negative outcome can be avoided. Through the use of Artificial Patient 106 the team member is trained and evaluated in the proficiency of their cognitive skills for treating the patient, not just their skills in performing medical procedures.

A network of Simulation Systems 100 located across the country can provide a cost-effective platform for medical device manufacturers, medical societies, hospitals, and educational institutions to distribute their cognitive training products to healthcare industry personnel. A standardized design and layout of each Simulation System 100 ensures that courseware that is developed at one Simulation System 100 location can be consistently utilized at other Simulation System 100 locations, providing the highest quality and most effective education. Universal standards will create a level playing field for all stakeholders. Medical personnel will have access to training on a daily basis if needed. Field sales people can host selected physicians at a local Simulation System 100 without incurring undue travel cost and time. Product adoption can occur in a matter of months nationally and internationally. Universal standards created for training and skill assessment can be measured and gauged. Each Simulation System 100 is designed to run courseware developed from a variety of different information sources including, but not limited to, medical device companies, medical societies, accreditation organizations, medical schools, medical centers who advance development of new procedures and therapies, and prominent industry authors. Simulation System 100 can be utilized to introduce new products, demonstrate difficult procedures, evaluate the effectiveness of new procedures, evaluate the effectiveness of team training, health care professional credentialing, and the effectiveness of hospital training programs.

Simulation System 100 may be used to establish uniform standards for the development of interactive training courseware and provide comprehensive and objective databases on the performance of medical operators, health care support personnel, and medical institutions. The database may provide feedback on the results of courseware for new health care products and procedures. The uniform standards and database may provide for both general information for all participants and proprietary information to individual participants, such as medical device manufacturers.

Simulation training utilizing Artificial Patient 106 is not simply an extension of traditional training methodology, but rather is a significant new tool for the medical industry. This tool has the built-in capability to consistently train healthcare professionals in the best-demonstrated practice and in the use of the product to achieve the highest probability of producing a successful outcome. In addition, the system evaluates individuals and teams of healthcare professionals in state-of-the-art medical procedures, knowledge, cognitive skills, and documents their performance of the simulated procedures. Cognitive skills can be gained from real life experience and from good simulation experience. Real life experiences are subject to many risks as opposed to simulation experiences, which have far fewer risks.

The aviation field, with its outstanding safety record, has learned that to provide true cognitive training you must address four key teaching elements: manual dexterity skills, perceptual skills, fund of knowledge, and decision making. Together, these four elements are combined into a dynamic learning process that exposes the participant to a variety of situations that builds depth of experience that cannot be gained in routine practice. Simulation improves decision making on the part of the participant, compared to traditional training methodology, because the consequences resulting from the interaction with the simulation interfaces are fed back to the participant immediately, just as in real life situations, forcing acceptance and/or resolution of problems in real-time. The commercial aviation field now relies on simulation training to the extent that commercially qualified pilots who are trained in simulators are certified to fly aircraft that are transporting revenue-paying passengers upon completion of training in certified simulation training facilities.

The parallels between the challenges of training pilots and physicians have been recognized by the medical societies. The American College of Cardiology has made a firm commitment that simulation training must be incorporated into the physician training process.

The availability of new medical technologies is expanding at an ever-increasing rate. This expanding universe of new technologies has created a formidable task for individual physicians, nurses, and local hospitals to continuously maintain their proficiency and provide the best possible healthcare consistently across the U.S. and around the world. Recently the Institute of Medicine reported it can take seventeen years for important medical discoveries to become accepted and used by the average doctor. On an annual basis, the United States Food and Drug Administration approves approximately 24 new medical devices for interventional cardiology alone. The daunting problem faced by medical device manufacturers is how to effectively introduce and train 10,000 physicians at 700 key hospitals in a new product every eighteen months. The cost and throughput rate for bringing physicians to formal training centers is so high that medical device manufacturers cannot formally train all of their customers. The industry costs resulting from sub-optimal patient outcomes is estimated to be in the billions of dollars. In the cardiovascular field alone, a one-percent reduction in the need for Cardiac Bypass Graft Surgery ("CABG") would result in a $250 million reduction in healthcare costs to the American public. As the case experience of the physician increases, the American College of Cardiology has reported a direct correlation between the success associated with increased frequency in procedures and decreased risk of death or risk from a CABG procedure. Simulation System 100 is designed to enhance the skills of individual physicians and their teams by increasing their frequency and exposure to "real patient" clinical experiences. Simulation System 100 interactive simulation software is designed to introduce specific learning objectives and levels of complexity, or procedural consequences, into simulation courseware. Essential learning objectives can be indexed to higher levels of complexity as the participant masters the new skill or product as demonstrated by resolving increasingly complex procedural consequences. This unique approach to training, afforded by simulation, controls the balance between overwhelming a physician or nurse with unrecoverable consequences against too little training designed to avoid poor outcomes.

As simulations are performed, metrics are gathered and stored. Metrics are pieces of raw data that indicate competency of the participant. Metrics can be time measurements, amount of substance used measurements, or test scores from a didactic test. Metrics are quantified and objective, not subjective, measurements of the participant's competency. Key metric parameters include basic skills, fund of knowledge, and decision making or process of care. These metrics can assist in assessing the design of new products or procedures, effectiveness of training programs, and the procedure competency of health care professionals. As this data grows, feedback can be provided to individual participants. For example, a participant may have taken six minutes to perform a particular procedure, whereas the average participant took three minutes. A participant can be shown where he or she falls on the curve of all previous participants and immediately begin corrective measures. Databases of this metric data are extremely valuable. They are valuable to the individual because the individual will know where he or she will have to work on improving as professionals. The databases are valuable because a hospital will know how well a particular individual's performance compares to others, and how well improvement is progressing where needed. The hospital will be able to assess how well their doctors are doing compared to another hospital, and will be able to compare simulation results to the outcomes on actual patients. Doctors can practice very difficult procedures via Simulation System 100 as well as the procedures that they may only do one or two times in a lifetime. This practice can be done ahead of time so that the doctor is prepared when a real situation requiring the medical procedure with a real patient arises.

Simulation System 100 may provide on-demand simulation courseware on new products and procedures, documentation for hospital-based accreditation, Continuing Medical Education ("CME") courses, and grand round simulations from leading physicians and nurses. Utilizing the metrics gathered over time, services such as health professional accreditation data and documentation management as well as training documentation for hospital accreditation, malpractice and liability insurance assessment can be provided. Simulation System 100 will enable the rapid distribution of manufacturers' new and existing products using proprietary simulation courseware and provide on-demand market information on utilization of their products by users.

System 100 software and training programs besides the real-time in-room simulations are designed for access and review on the World Wide Web. This allows healthcare professionals to access training programs tailored to their training needs around their work schedules. Simulation System 100 and its associated training programs and website access provides healthcare professionals with a more time-efficient and cost-effective means for maintaining their proficiency. The distributive processing simulation method and system for training healthcare teams is a very efficient, effective, and consistent way to provide broad-range, on-demand simulation training and educational products. Worldwide access requires a high level of security. Proprietary courseware as well as general information may be distributed selectively. For example, a medical device manufacturer may limit distribution of new product courseware to approved clinical evaluation facilities only. Similarly, medical societies can limit distribution of new courseware to active members/subscribers.

Simulation System 100 is located in an appropriately sized room and is set up to resemble an actual medical environment, such as a hospital emergency room, a catheter lab, operating room, etc. Lighting, sounds, medical equipment, and ancillary devices are designed to create the realism of conducting actual interventional procedures. Simulation System 100 is capable of providing individual operator as well as interactive team training. Simulator Table 102 supports Simulation Device 104, which is located within Artificial Patient 106, at a convenient height for the team participants. In one embodiment, Artificial Patient 106 having Simulation Device 104 is the Interventional Tactile-Force-Feel Simulator, an interactive artificial patient device developed by Simulation Corporation. One skilled in the art will recognize that many other simulation devices could be used, including electro-mechanical devices, hydraulic devices, electro-hydraulic devices, magnetic devices, pneumatic devices, variable density simulation devices, etc. For example, for crash cart training, an artificial patient having a simulation device built within may have sensors that detect the placement of the paddles by the participant on the artificial patient's chest, and provides responses based on the optimal or sub-optimal placement of the paddles.

Simulation System 100 is shown in FIG. 1 as having six computers, though one skilled in the art will recognize that more or fewer computers could be utilized in the present invention depending upon the type of simulation system (hospital emergency room, a catheterization lab, operating room, etc.) and the particular medical procedure being simulated for training purposes (crash cart, interventional cardiology, interventional radiology, interventional neurology, arthroscopy, endoscopy, laparoscopy, anesthesia, and intensive and critical care nursing). Regardless of the number, all of the computers are interconnected over Communications Link 108 which has Network Switch 110. Communications Link 108 may be an Ethernet or other type of LAN.

In one embodiment Simulation System 100 incorporates a Simulation Control Workstation 112 which has Simulation Control Workstation Desk 118. Simulation Server Computer 116, Simulation Control Workstation Monitor 114, and Team Video Monitor 120 sit atop Simulation Control Workstation Desk 118. An operator who may be in charge of the simulation may sit at Simulation Control Workstation Desk 118 and select the simulation to run and initiate the commands to begin the simulation. Once a Simulation System 100 has been set up in a given location and initialized, and a number of simulations have been loaded into the system, then any of the participants can select and start a simulation from any of the workstations. An operator is therefore optional at this point.

Live action captured by several Video Cameras 156 is displayed on Team Video Monitor 120. In a typical simulation, one Video Camera 156 is aimed at the nurse attending Nurse Control Workstation 140, one Video Camera 156 is aimed at the physician's face at Physician Workstation 152, and another Video Camera 156 is aimed at the physician's hands as he or she works on Artificial Patient 106. The images captured by any one of the Video Cameras 156 can be displayed on Team Video Monitor 120. Typically, the Video Cameras 156 are wireless, and Receiver 158 receives the signals and sends them to Team Video Monitor 120.

Resident on Simulation Server Computer 116 are various software modules, including Simulation Engine Module 202, Virtual Team Members Module 204, Data Manager Module 206, Metric Module 208, Pre-Simulation Brief Web Pages 210, Testing Module 212, Knowledge Repository Module 214, and Event Handler Module 215. One skilled in the art will recognize that, due to the networked environment, the software modules may reside on any one of the various computers in Simulation System 100. The locations of the software modules shown is thus exemplary for the embodiment being discussed, and represent a logical and practical placement.

Simulation Engine Module 202 provides master timing for all the other software modules. It also informs the other software modules where data can be obtained. Virtual Team Members Module 204 provides simulated participants when all the participants for a particular simulation cannot be in the room housing Simulation System 100 at one time. It also substitutes simulated participants if a remote participant strays too far in their responses from the in-room participants. This substitution may be automatic or initiated by an in-room participant. Data Manager Module 206 manages the storage of simulation data so that statistical analysis can be performed on aggregate data. Metric Module 208 outputs metric data in a format a report generator can read. The report generator, which may be a third party software package or a built-in module (not shown in FIG. 2) then displays the metrics in a user readable format.

Pre-Simulation Brief Web Pages 210 stores the URL's for local or remote World Wide Web sites that are displayable on an Internet web browser. Simulation System 100 is connectable via Communications Link 160 to Communications Network 162, which in a preferred embodiment is the Internet, but may also be a LAN or a WAN or other suitable communication technology. Individuals may participate in a selected simulation from one or more Remote Locations 164 via Communications Links 166 and Communications Network 162, more fully discussed in relation to FIG. 3 below, provided the total distance does not exceed the latency boundaries of the particular hardware in use to maintain real-time participation. In addition, Simulation System 100 uses the World Wide Web and the Internet to connect physicians, nurses, hospitals, device and drug manufacturers, medical societies, insurers, and the government in a dynamic information network. Utilizing the distributive processing simulation method and system for training healthcare teams of the present invention as the common link, healthcare professionals may access the latest advancements in new products and procedures and perform these procedures on a Simulation System 100 located in various cities around the country and the world. This integrated education system will enable physicians, nurses, and technicians to update their medical knowledge and practice the latest skills in a "real patient" medical environment anywhere in the world. Simulation System 100 enables healthcare professionals to increase their cognitive skills by exposing them to challenging medical situations that may otherwise occur only a few times in their careers. Practitioners learn and grow through these "real patient" experiences. This "real patient" training allows for more efficient accreditation of medical personnel, accelerated learning curves, and improved patient outcomes.

Courseware will be provided in programs and accessed from a digital library server via the World Wide Web. The digital library may be stored on Simulation Server Computer 116, or on a separate server computer located anywhere in the world accessible by the World Wide Web. A program is defined as a simulated procedure from start to finish covering anatomy, physiology, and disease characteristics that a simulation user might encounter during an actual interventional procedure. Each program may consist of a skill, procedure, technique, or complication. The program will provide background information and data to start and complete each program, i.e., data on the patient's age, health, previous procedures, catheter type and size to be used, room set up, etc. Each program will include ancillary materials a participant might refer to and want to retain after the simulation procedure.

The library will offer basic programs and premier programs. Basic programs will cover general subjects of interest to physicians and other health care professionals involving skill maintenance, credentialing, and CME. Premier programs will focus on specific subjects concerning medical device companies, medical societies medical schools and leading authors. Premier programs will feature new products and procedures, clinical studies, outcomes research and analysis, and grand rounds by leading practitioners.

A worldwide Internet/World Wide Web distribution system can rapidly distribute programs and collect procedure data and participant information. This distribution/collection system will allow the participant to access a digital library on-demand to provide a wide variety of programs and insure that the latest version of the program is available. This distribution/collection system will also allow cost-effective collection of metrics data.

In addition, the distribution system is a primary link to reach participants. The distribution system is designed for easy access and use of the library of programs. The distribution system provides links to participants that encourage routine use by offering new information on a daily basis and by providing services that are essential to daily practice. Continually updated information, such as the latest clinical information on new studies, new products, technical searches and professional forums for information exchange, is available.

Testing Module 212 is compliant with the American Institute of Computer Based Technology Committee ("AICC") training records systems that some hospitals may have and some may not. The testing may also occur via a local or remote web site utilizing locally developed didactic exams or software developed by medical healthcare providers, manufacturers, and/or regulatory authorities. Knowledge Repository Module 214 handles the access by other software modules to Knowledge Repository 216. Simulation System 100 is event driven. Event Handler Module 215 provides a dispatching system to let other modules know an event has occurred. Each event may trigger one or more responses. When a trigger event occurs, then that event is sent out by Event Handler Module 215 through the network to any of the other software modules that need to know of the event and respond.

Knowledge Repository 216 in one embodiment of the invention resides on Simulation Server Computer 116. In another embodiment of the invention, Knowledge Repository 216 resides on a different computer that may be located next to Simulation Server Computer 116 or located off site, and a communications link such as the Internet or a LAN or a WAN or other suitable communication system connects Knowledge Repository 216 with Simulation Server Computer 116. The predetermined data necessary to run a given simulation is stored in Knowledge Repository 216, which has Simulation Models 218, Patient Models 220, Video Models 222, Audio Models 224, Neural Networks 226, Statistical Networks 228, Expert System Databases 230, Other Databases 232, Still Images 234, Disease Models 236, and Text Documents 238.

Simulation Models 218 are multidimensional mathematical models that represent real instruments such as a catheter, catheter tip shape, stent, etc. Patient Models 220 are also multidimensional mathematical models that represent portions of a simulated patient, such as the vascular tree, aortic arch, renal arteries, heart, etc. Video Models 222 are video loops and video vignettes associated with the various simulations. Audio Models 224 are audio loops and audio vignettes associated with the various simulations. Neural Networks 226 are mathematically based neural networks used for prediction and testing and validation of data. Statistical Networks 228 are mathematically based statistical networks reduced to computer algorithms used for prediction and verification of data. Expert System Databases 230 are data stored such that a series of events leads to a specific data entry. Other Databases 232 are databases relevant to particular simulations. Still Images 234 may be computer generated images or actual photographs. Text Documents 238 are the various documents that may be converted to speech for use by the animated mentors, and other documents needed for the simulations.

Drug Dispenser Control Workstation 122 has Drug Dispenser Simulation Desk 124 which replicates the function of drug and/or fluid dispensing apparatus. Drug Dispenser Computer 126 and Drug Dispenser Workstation Monitor 128 may sit atop Drug Dispenser Simulation Desk 124. In a preferred embodiment of the invention, Drug Dispenser Workstation Monitor 128 has a touch-sensitive display screen for fast and direct user input, eliminating the clutter of a keyboard and/or a mouse at the workstation and may resemble a real drug dispenser apparatus. Drug Dispenser Simulation Module 240 resides on Drug Dispenser Computer 126. Drug Dispenser Simulation Module 240 provides a user interface to requisition drugs and makes them available at Nurse Control Workstation 140 and/or to Physician/Assistant Control Workstation 148.

Four computers are housed within Simulator Table 102 below the top surface where they are out of the way, yet easily accessed when needed. The four computers are Road Map Computer 130, Nurse Computer 132, Simulation Device Computer 134, and Physician Computer 136. One skilled in the art recognizes there may be more or fewer computers than those shown in FIG. 1.

Road Map Computer 130 has Graphics Module 242. A still picture selected by the physician from one of the many diagnostic images presented to the physician at the beginning of a simulation is displayed on Road Map Monitor 138 throughout the medical procedure simulation. Road Map Monitor 138 sits on Monitor Stand 146, which may be free standing or attached to Simulator Table 102. The selection of the diagnostic image by the physician is one of the factors the physician is graded on during the simulation. The better or more optimal the diagnostic view the physician selects, the better grade the physician will receive for selecting the better road map diagnostic image. Graphics Module 242 also provides a simulation of fluoroscopic images, sonogram images, MRI, PET, or other images of the like in synchronization with the currently running simulation.

Nurse Control Workstation 140 has Nurse Workstation Monitor 142 which is connected to Nurse Computer 132. Nurse Computer 132 has Nurse Control Module 244, Nurse Mentor Module 246, Patient Response Module 248, and Peripheral Module 250. In a preferred embodiment of the invention, Nurse Workstation Monitor 142 has a touch-sensitive display screen for fast and direct user input, eliminating the clutter of a keyboard and/or a mouse at the workstation.

Nurse Control Module 244 provides a user interface for a nurse to simulate administering drugs and interaction with Artificial Patient 106. Nurse Mentor Module 246 provides an animated mentor, a virtual person, who appears on Nurse Workstation Monitor 142 at various times throughout the simulation. The virtual person at the beginning of the simulation may appear and tell the nurse about what he or she is about to do.

In one embodiment of the invention, various text files associated with the simulation selected may be retrieved from Text Documents 238 within Knowledge Repository 216. The text in the files is then synthesized into audio speech, and the virtual person's image is synchronized with the audio speech such that the virtual person's lips move, eyes blink, and other facial movements are coordinated such that the virtual person appears to be talking naturally, just as a real person would talk. Thus, three separate technologies, 3D graphics modeling and rendering, taking text and converting it into actual audio, and then combining the 3D graphics modeling with the audio, provide a very realistic virtual person. This is all done on-the-fly in response to events driven by the participants during the simulation. Simulation System 100 has complex decision matrixes that are followed based upon the actions of the team of participants. The animated mentors appear on the various monitors at various times linked to on-the-fly events that are predicted by an algorithm. The physician may make one decision, and the nurse may make another decision based upon the physician's decision. The animated mentor needs to say the right thing based upon these two independent decisions, and this has to be done on-the-fly. Since the medical team participants will be doing things on-the-fly, the system has to be able to respond on-the-fly as well, and will retrieve the appropriate text file for conversion to speech. In addition, some of the events are actually random, as opposed to just in response to what one of the participants did. If a participant makes a bad decision then worse events may take place. Even if a participant makes good decisions the random event could result in a bad event happening. The system does have random serious events that happen similar to occurrences in real life. Thus, the system reaches a level of realism heretofore not obtained with prior art simulation systems.

For example, in prior art simulations, when the participants arrive at the training site, they typically read about the pending simulation they are about to engage in. In the real world, this is not typically how doctors and nurses learn about a patient they are about to work on. For example, when a patient is being transported to an emergency room from a remote location, typically the doctor may hear about the patient as he or she is walking down the hall with the paramedic who has done an initial triage of the patient. The paramedic may tell the doctor that the patient has one or more broken bones, is bleeding from certain areas, and relay certain vital signs such as blood pressure and pulse. The paramedic may then tell the doctor about a second patient who has a different set of injuries and vital signs. The emergency room nurse may receive a phone call from the ambulance as it is on the way, and is told that the first patient has had three IV's, and the particulars regarding the patient's injuries. Thus, the doctor and the nurse typically get patient information verbally and have to start assimilating all of the information as they prepare to receive and work on the patient. The system of the present invention seeks to emulate this reality by providing audio and visual input to the team participants through virtual people.

Patient Response Module 248 provides the varied responses a patient can have depending upon the actions taken by individuals comprising the medical team as well as the random expression of data that is part of a given simulation. The Disease Models 236 may create an adverse event unrelated to the primary diagnosis of the patient but statistically possible based on the general fund of medical knowledge. These responses may be made via video presentations, audio presentations, ECG waveforms, heartbeat rate, pulse rate, oxygen saturation, etc. For example, the Patient Response Module 248 may output an audio response where the simulated patient is attributed to say "My chest hurts and I need to sit up" or "I'm feeling dizzy and I think I am going to pass out". What the simulated patient says or does would not necessarily be the same every time the simulation is run. It all depends on what the participant(s) does and any random events. The simulated patient may give the participant a clue. The participant can use the clue and make a good decision or fail to pick up on the clue and make a less than optimum decision or even a fatal decision. How well the team member recognizes and responds to this adverse event may determine the final patient outcome. Metric Module 208 will record the events and team member actions.

Peripheral Module 250 provides a user interface for the physician or assistant to interact with the simulation. For example, for cardio simulations, the interactions include changing view angle, zooming, inflating a balloon, multidimensional view select, etc.

Simulation Device Computer 134 has Tactile Module 252, Motion Control Module 254, and ECG Module 256. Simulation Device 104 is connected to Simulation Device Computer 134. Additional simulation devices may also be connected to Simulation Device Computer 134, such as Simulation Device 258. Tactile Module 252 provides force feel to the medical instrument simulator motion control system and provides an interface via the motion control cards to the medical instrument simulation system. Motion Control Module 254 provides an interface to the motion control device. ECG Module 256 provides simulation of patient ECG waveforms in synchronization with the currently running simulation. The ECG waveforms are displayed on ECG Monitor 144, which sits on Monitor Stand 146.

Physician/Assistant Control Workstation 148 has Physician/Assistant Workstation Monitor 150 which is connected to Physician Computer 136. Physician Workstation 152 has Monitor Stand 146 which supports Road Map Monitor 138, ECG Monitor 144, and Physician Workstation Monitor 154 which is connected to Physician Computer 136. Physician Computer 136 has Physician Control Module 260 and Physician Mentor Module 262. Physician Control Module 260 provides a user interface for a physician or physician's assistant to simulate administering treatment and interaction with Artificial Patient 106. Physician Mentor Module 262 provides an animated mentor, a virtual person, who may appear on any of the monitors in Simulation System 100 at various times throughout the simulation. The virtual person at the beginning of the simulation may appear and tell the physician or assistant about what he or she is about to do.

Simulation System 100 utilizes a technique called Tri-Reality Simulation. Tri-Reality Simulation is a hybrid combination of actual (real) components, virtual components, and simulated components. A simulated component exists in reality, such as a catheter manipulated by the physician on Artificial Patient 106 in conjunction with Simulation Device 104. Real components may be fluoroscopic, sonographic, MRI, PET, or like images taken from real patients and used in the simulation through display on a monitor. Rendered images displayed on a monitor are the virtual components, such as a rendered image of a contrast injection.

In typical prior art simulation systems that employ virtual reality, backgrounds for graphic display are being fully volume rendered via software. This full volume rendering increases the computational time and required hardware resources by a factor of ten to fifteen times over the Tri-Reality Simulation method of the present invention. Volume rendering everything being displayed with software necessitates utilizing expensive and high-powered processing hardware to do the necessary mathematical computations. The present invention uses real fluoroscopic, sonogram, MRI, or PET video images in the background (retrieved from Knowledge Repository 216), and renders only the medical instrument being used by the physician in the simulation in the foreground. By doing this, the speed of the system is increased well beyond the capabilities of prior art systems. The distributive processing simulation method and system for training healthcare teams invention utilizes this concept, and is folded into it.

Figure 3:
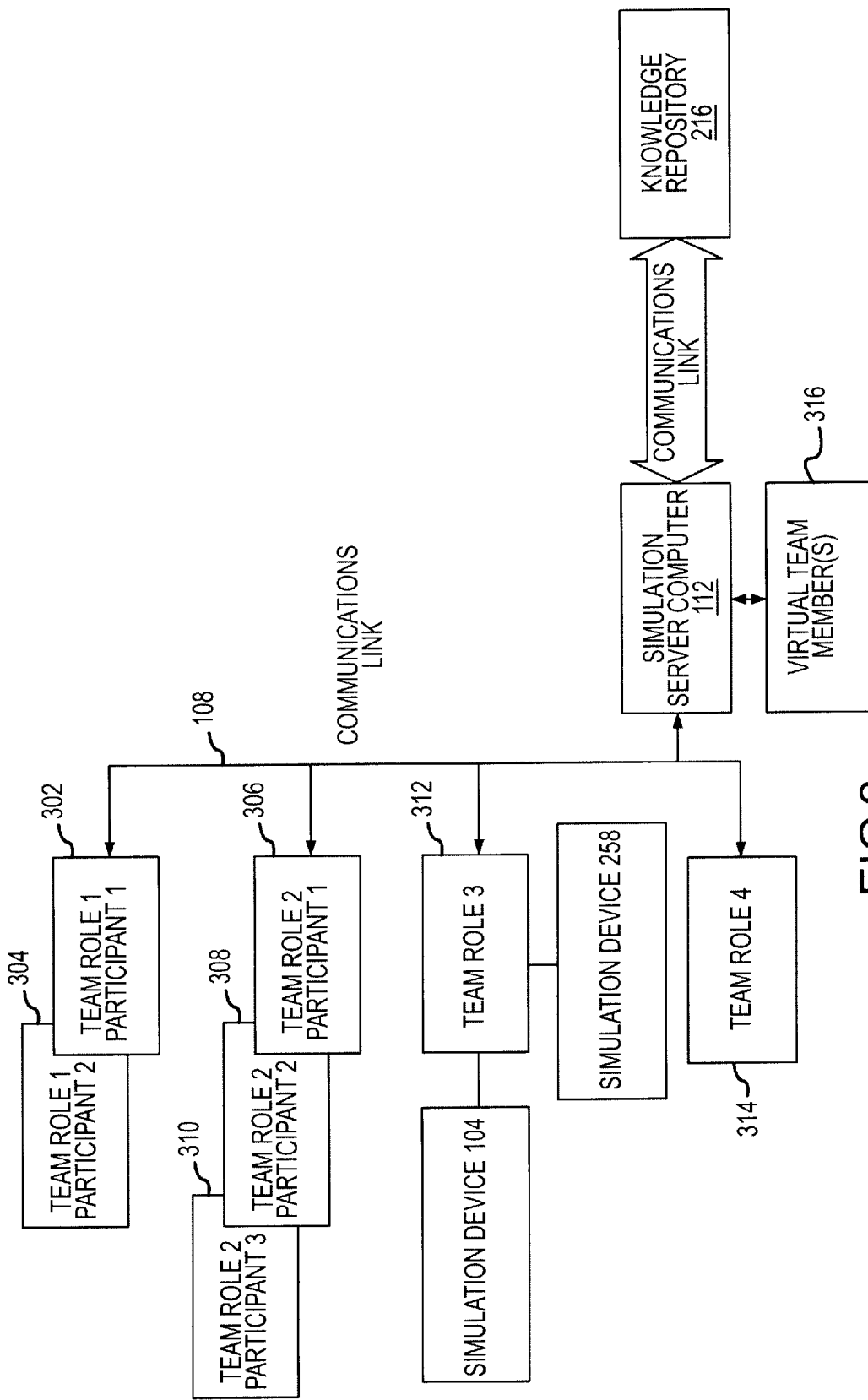
FIG. 3 shows a schematic/block diagram of the team role distribution for an exemplary embodiment of the distributive processing simulation method and system for training healthcare teams of the present invention.

FIG. 3 shows a schematic/block diagram of the team role distribution for an exemplary embodiment of the distributive processing simulation method and system for training healthcare teams of the present invention. Referring now to FIG. 3, Block 302 represents Team Role 1 and Participant 1 for a selected simulation. By way of example, Team Role 1 may be for the person manning Drug Dispenser Control Workstation 122 (FIG. 1) in the room housing Simulation System 100. Block 304 represents Team Role 1 and Participant 2. Simulation System 100 allows for additional participants in some roles of a simulation. The additional participants may be located in a nearby room, a different city, a different state, or in another country. They may be connected to Simulation System 100 through Communications Link 108 or through Communications Network 162.

Block 306 represents Team Role 2 and Participant 1 for a selected simulation. Team Role 2 may be for the person manning Nurse Control Workstation 140 (FIG. 1). Block 308 represents Team Role 2 and Participant 2, and Block 310 represents Team Role 2 and Participant 3. The additional participants may be located in a nearby room, a different city, a different state, or in another country.

Block 312 represents Team Role 3, which may be for the person manning Physician Workstation 152 (FIG. 1). Simulation Device 104 and and/or Simulation Device 258 are utilized by the Team Role 3 participant.

Block 314 represents Team Role 4, which may be for the person manning Physician/Assistant Control Workstation 148 (FIG. 1), which may or may not have additional participants. Simulation Server Computer 116, drawing from Knowledge Repository 216, delivers whatever data and programs are needed to each of the workstations. What gets delivered to each one of the workstations is completely dependent on whether or not that workstation has a live participant, or a virtual participant, or multiple participants. When a live participant is not available to fulfill one of the team roles required for a given simulation, Simulation Server Computer 116 delivers a Virtual Team Member 316 to the workstation. Everything about the simulation is controlled from Simulation Server Computer 116 using standard Microsoft technology.

Figure 4:
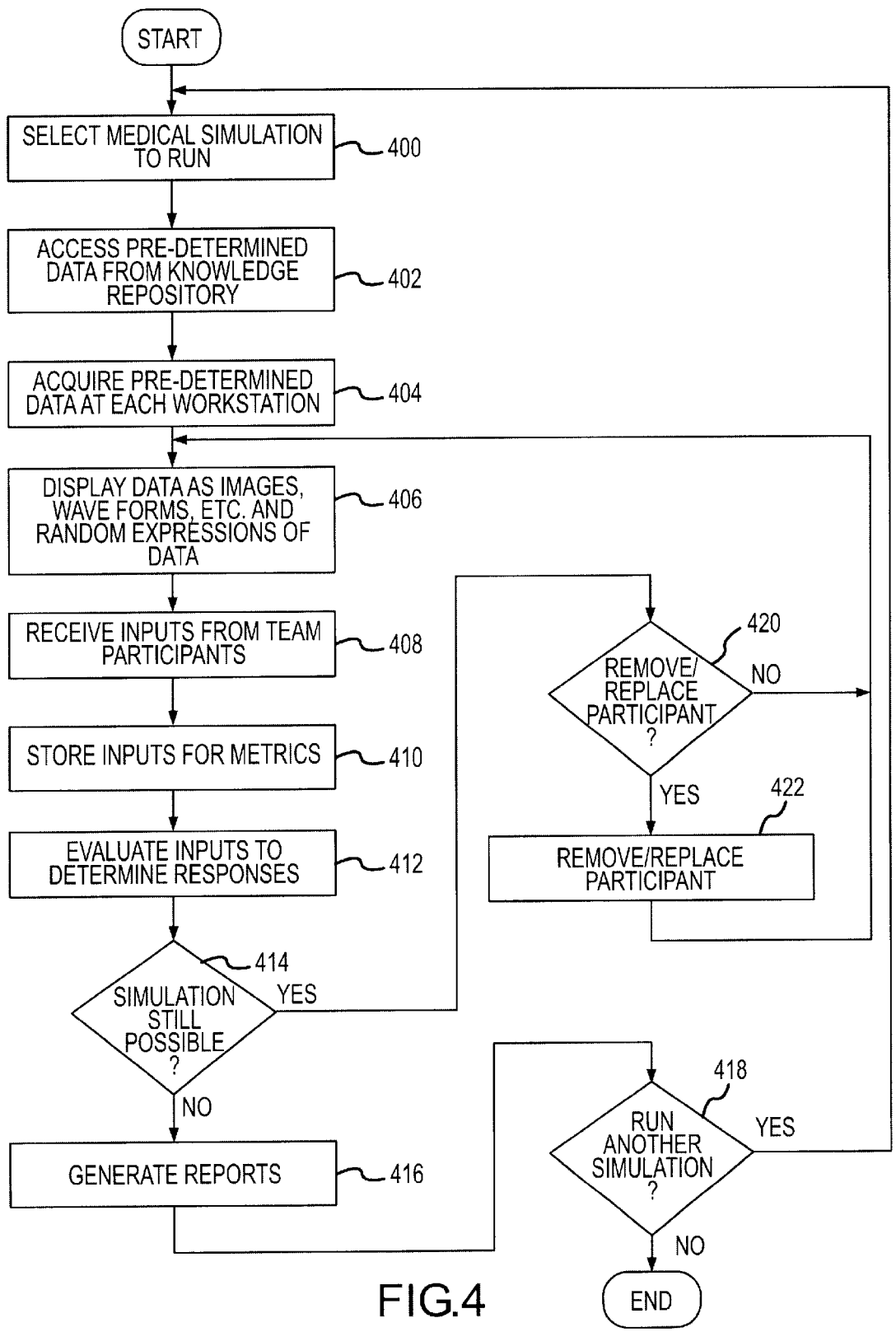
FIG. 4 shows a flow diagram of an exemplary embodiment of the distributive processing simulation method for training healthcare teams of the present invention.

FIG. 4 shows a flow diagram of an exemplary embodiment of the distributive processing simulation method for training healthcare teams of the present invention. Referring now to FIG. 4, in step 400 the operator manning the Simulation Control Workstation 112 selects the medical procedure to be run on Simulation System 100 from a menu of simulation procedures currently available. After making the selection, the operator inputs the number of participants and whether they are in-room participants or remote participants. Any given simulation may require one, two, or more participants. If the medical procedure selected has a role for a nurse, but a nurse participant is not available, the operator can indicate this and Simulation System 100 will provide a virtual nurse from Virtual Team Member 316. The operator can select options such that each workstation is different, or two or more workstations could be the same, and that there may be multiple remote participants. Thus, not only in-room participants can play a role, but one or more participants outside the room may play their role in a remote fashion while the simulation is running. The participants in remote locations can answer questions, respond to events, etc., but they do not have Artificial Patient 106.

In step 402, after all the required information has been provided and the command to begin the simulation has been given by the operator, Simulation Server Computer 116 accesses the appropriate pre-determined data for the selected simulation from Knowledge Repository 216 and notifies the various other computers controlling the other workstations what programs to run, what data they need, and where the data is located. The various other computers then launch the appropriate programs and acquire the data they need from Knowledge Repository 216 in step 404. The data that is required at each workstation is determined at the beginning of the simulation.

In step 406 each computer executes the various programs in the software modules that have been loaded. Where appropriate, data is sent for display on the various monitors, virtual people may appear and begin talking, etc. As the simulation progresses, responses based on participant input are displayed. In addition, the random expression of data not in response to any participant input may also be displayed.

In step 408 Simulation Server Computer 116 begins receiving input from the various team participants, from those in remote locations as well as from those in-room. For example, the doctor involved in the simulation in-room may insert a catheter in Simulation Device 104 within Artificial Patient 106. The software modules in Simulation Device Computer 134 will receive and analyze location data and force data based on the doctor's manipulation of the catheter, and transmit responses to Simulation Server Computer 116. A nurse in the simulation may administer a drug, and this input is sent to Simulation Server Computer 116.

In step 410 some or all of the inputs received are stored to become part of the metrics data. Simulation Server Computer 116 in step 412 evaluates the inputs received. Decision trees, matrices, random events, and algorithms are utilized to produce outcomes to the various inputs. Step 414 determines if the responses evaluated and accumulated to date are such that the simulation can or should continue. If the determination is no, either due to the fact that the simulation has been successfully completed, or due to the errors made by the participants in managing the situation such that the simulation cannot be continued, then in step 416 reports are generated that evaluate the performance of the team as a whole as well as the individual participants. These reports may be displayed on the various monitors, or printed out on an attached printer. Step 418 determines if the same or another simulation is to be run. If yes, control returns to step 400. If the determination in step 418 is no, then the method of the present invention ends.

If the determination in step 414 is yes, then step 420 determines if any individual participant has strayed too far in terms of their individual responses up to this point in time in the simulation such that they must be removed from the simulation since recovery is not possible. If no, control returns to step 406 where new response data is sent for display. If the determination in step 420 is yes, then in step 422 the participant is removed, and depending upon the simulation being run and the particular role, Simulation Server Computer 116 may substitute a Virtual Team Member 316 for the individual participant removed, or just remove the participant from further participation.

For example, there may be two nurses participating in the simulation, one in-room and one remotely. If one of the nurses administers the wrong medicine to Artificial Patient 106, their simulations will separate. Each nurse will begin to receive different data at their workstation. The nurse who made the mistake is going to get indications on the workstation monitor that something has gone wrong. Depending upon the severity of the mistake made by the nurse, the feedback data on Artificial Patient 106 may indicate that Artificial Patient 106 has died. If the remote nurse has made the mistake and the patient dies, the remote nurse is removed from the rest of the simulation. If the remote nurse is doing the right thing, but the in-room nurse has made the mistake, the feedback to the other in-room participants will get indications at their workstations that something has gone wrong. The in-room participants may now react to these responses and try to correct the problem. The remote nurse in this instance will have the option of continuing with the error but not having it counted against their score, or getting the expected response and the remote simulation will continue with virtual team members provided by Virtual Team Members Module 204. Thus, the two nurses have different sets of conditions occurring such that in effect, they are working on different patients. After step 422, control returns to step 406 where new responses to the participant input is sent for output.

In another example, a nurse and doctor may be performing a procedure together. If the nurse administers a wrong drug the physician may accept or reject his/her action. If he accepts the nurse's action the simulation will continue and an adverse event may happen as result of the administration of the wrong drug. The outcome of this simulation will be related to how the nurse and doctor manage the adverse event. Metric Module 208 will record the event and subsequent actions. However, if the physician rejects the nurse's action, the nurse will be eliminated from the simulation and the simulation will continue with a virtual nurse provided by Virtual Team Members Module 204, and no adverse event will be experienced by the physician.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A method for training medical teams in the performance of medical procedures utilizing a physical artificial patient, the method comprising:
   (a) running on a simulation server computer at least one simulation of at least one medical procedure utilizing the physical artificial patient;
   (b) applying a medical instrument to a simulation device associated with the physical artificial patient;
   (c) sending data corresponding to said medical instrument in cooperation with said simulation device to said simulation server computer;
   (d) accessing by said simulation server computer a plurality of medical images taken of a real patient from a knowledge repository relating to said at least one simulation of at least one medical procedure utilizing the physical artificial patient;
   (e) displaying on at least one monitor a portion of said plurality of medical images of said real patient in a background of said at least one monitor, wherein said portion of said plurality of medical images displayed is derived from said data corresponding to said medical instrument in cooperation with said simulation device associated with the physical artificial patient;
   (f) rendering in the foreground of said at least one monitor a representation of said medical instrument corresponding to said medical instrument in cooperation with said simulation device associated with the physical artificial patient derived from said data;
   (g) accessing by said simulation server computer predetermined data from said knowledge repository relating to said at least one simulation of at least one medical procedure utilizing the physical artificial patient; and
   (h) distributing to each of a plurality of workstations by said simulation server computer a portion of said predetermined data, wherein said portion of said predetermined data distributed to said each of said plurality of workstations defines at least one team role for at least one participant to play in said at least one simulation of at least one medical procedure utilizing the physical artificial patient;
   wherein when said at least one participant strays too far in their responses during said at least one simulation of at least one medical procedure utilizing the physical artificial patient, replacing said one of said at least one participant, by said simulation server computer, with a simulated participant for the duration of said at least one simulation of at least one medical procedure utilizing the physical artificial patient.

2. A method according to claim 1 wherein said at least one team role comprises at least one of a physician role, a nurse role, a drug dispenser role, and a physician/assistant role.

3. A method according to claim 1 wherein said at least one participant participates in said at least one simulation of at least one medical procedure utilizing the physical artificial patient from a remote location via a communications network.

4. A method according to claim 1 further comprising:
   when a live participant is not available to fill said at least one team role, replacing said live participant, by said simulation server computer, with a simulated participant.

5. A method according to claim 1 further comprising:
   storing in said knowledge repository a plurality of metrics received from at least one of said plurality of workstations during said at least one simulation of at least one medical procedure utilizing the physical artificial patient.

6. A method according to claim 5 wherein said plurality of metrics comprises raw data of at least one of a time measurement, an amount of substance used measurement, an amount of radiation exposure, a medical team member action, an event, and a test score from a didactic test.

7. A method according to claim 1 further comprising:
   displaying an animated mentor on said at least one monitor, wherein said at least one animated mentor provides audio and visual output to said at least one participant at various times on said at least one monitor during said at least one simulation of at least one medical procedure utilizing the physical artificial patient.

8. A simulation apparatus for training medical teams in the performance of medical procedures utilizing a physical artificial patient, the simulation apparatus comprising:
- a simulation server computer for running at least one simulation of at least one medical procedure utilizing the physical artificial patient;
- a knowledge repository connectable to said simulation server computer for storing a plurality of medical images taken of a real patient;
- a simulation device associated with the physical artificial patient;
- a medical instrument for applying to said simulation device associated with the physical artificial patient, wherein said simulation device sends data to said simulation server computer corresponding to said medical instrument in cooperation with said simulation device;
- at least one monitor connectable to said simulation server computer for displaying a portion of said plurality of medical images of said real patient in a background of said at least one monitor, wherein said portion of said plurality of medical images displayed is derived from said data corresponding to said medical instrument in cooperation with said simulation device associated with the physical artificial patient;
- a graphics software module, resident on said simulation server computer, for rendering in the foreground of said at least one monitor a representation of said medical instrument, corresponding to said medical instrument, in cooperation with said simulation device associated with the physical artificial patient derived from said data;
- a plurality of workstations connectable to said simulation server computer, wherein said simulation server computer accesses predetermined data from said knowledge repository relating to said at least one simulation of at least one medical procedure utilizing the physical artificial patient, and distributes to each of said plurality of workstations a portion of said predetermined data, wherein said portion of said predetermined data sent to said each of said plurality of workstations defines at least one team role for at least one participant to play in said at least one simulation of at least one medical procedure utilizing the physical artificial patient; and
- a virtual team member software module, resident on said simulation server computer, for replacing said at least one participant when said at least one participant strays too far in their responses during said at least one simulation of at least one medical procedure utilizing the physical artificial patient.

9. The simulation apparatus according to claim 8 further comprising:
- a simulation device computer in communication with said simulation server computer, for controlling said simulation device and receiving input from said medical instrument applied to said simulation device associated with the physical artificial patient.

10. The simulation apparatus according to claim 8 wherein said plurality of workstations comprises at least two of a physician workstation, a nurse workstation, a drug dispenser workstation, and a physician/assistant workstation.

11. The simulation apparatus according to claim 10 wherein said physician workstation further comprises:
- a physician workstation monitor;
- a physician computer;
- a physician control software module, resident on said physician computer, for providing a user interface for a physician team member to simulate administering treatment and interaction with said simulation device associated with the physical artificial patient; and
- a physician mentor software module, resident on said physician computer, for providing at least one animated mentor, wherein said at least one animated mentor provides audio and visual output at various times on said physician workstation monitor during said at least one simulation of at least one medical procedure utilizing the physical artificial patient.

12. The simulation apparatus according to claim 10 wherein said nurse workstation further comprises:
- a nurse workstation monitor;
- a nurse computer;
- a nurse control software module, resident on said nurse computer, for providing a user interface for a nurse team member to simulate administering drugs and interaction with the physical artificial patient; and
- a nurse mentor software module, resident on said physician computer, for providing at least one animated mentor, wherein said at least one animated mentor provides audio and visual output at various times on said nurse workstation monitor during said at least one simulation of at least one medical procedure utilizing the physical artificial patient.

13. The simulation apparatus according to claim 10 wherein said drug dispenser workstation further comprises:
- a drug dispenser workstation monitor;
- a drug dispenser computer;
- a drug dispenser simulation software module, resident on said drug dispenser computer, for providing a user interface for a drug dispenser team member to requisition drugs and make said requisitioned drugs available to at least one of said nurse workstation and said physician/assistant workstation.

14. The simulation apparatus according to claim 8 further comprising:
- at least one remote location; and
- a communications network linking said remote location to said simulation server computer, wherein said at least one participant participates in said at least one simulation of at least one medical procedure utilizing the physical artificial patient from said remote location via said communications network.

15. The simulation apparatus according to claim 8 further comprising:
- a virtual team member software module, resident on said simulation server computer, for providing at least one simulated participant in the place of a live participant not available during said at least one simulation of at least one medical procedure utilizing the physical artificial patient.

16. The simulation apparatus according to claim 8 wherein said simulation server computer further comprises:
- a metric software module for recording a plurality of metrics gathered from at least one of said plurality of workstations during said at least one simulation of at least one medical procedure utilizing the physical artificial patient.

17. The simulation apparatus according to claim 8 wherein said plurality of metrics are raw data comprising at least one of a time measurement, an amount of substance used measurement, an amount of radiation exposure, a medical team member action, an event, and a test score from a didactic test.

* * * * *